United States Patent
Georgeaux et al.

(10) Patent No.: US 7,228,147 B2
(45) Date of Patent: Jun. 5, 2007

(54) METHOD FOR CONTROLLING TRANSMISSION POWER

(75) Inventors: Eric Georgeaux, Montigny-le-Bretonneux (FR); Denis Fauconnier, Saint-Remy-les-Chevreuse (FR)

(73) Assignee: Nortel Networks Limited, St. Laurent, Quebec (CA)

( * ) Notice: Subject to any disclaimer, the term of this patent is extended or adjusted under 35 U.S.C. 154(b) by 339 days.

(21) Appl. No.: 10/479,110

(22) PCT Filed: May 29, 2002

(86) PCT No.: PCT/FR02/01808

§ 371 (c)(1),
(2), (4) Date: Nov. 24, 2003

(87) PCT Pub. No.: WO02/098017

PCT Pub. Date: Dec. 5, 2002

(65) Prior Publication Data

US 2004/0152481 A1    Aug. 5, 2004

(30) Foreign Application Priority Data

Jun. 1, 2001    (FR)    ................... 01 07256

(51) Int. Cl.
*H04B 7/00*    (2006.01)
(52) U.S. Cl.    .............. 455/522; 455/69; 370/318
(58) Field of Classification Search ........... 455/422, 455/69, 13.4, 127.1, 68, 70, 3.02, 522, 517; 370/342, 311, 335, 331, 332, 318
See application file for complete search history.

(56) References Cited

U.S. PATENT DOCUMENTS

| | | | | |
|---|---|---|---|---|
| 6,021,114 A | * | 2/2000 | Shaffer et al. | 370/232 |
| 6,175,744 B1 | * | 1/2001 | Esmailzadeh et al. | 455/522 |
| 6,728,226 B1 | * | 4/2004 | Naito | 370/328 |

(Continued)

FOREIGN PATENT DOCUMENTS

EP    0 631 397    12/1994

(Continued)

OTHER PUBLICATIONS

Technical Specification 3G TS 25.215 ("Physical layer—Measurements (FDD)"), version 3.3.0 published by the 3GPP ("3rd Generation Partnership Project"), Jun. 2000, section 5.1.1.

(Continued)

*Primary Examiner*—Nay Maung
*Assistant Examiner*—Dominic E. Rego
(74) *Attorney, Agent, or Firm*—Trop, Pruner & Hu, P.C.

(57) ABSTRACT

In certain circumstances, a mobile radiocommunication terminal estimates an initial radio signal transmission power, i.e. a random access request, to a base station located within the range thereof. If it is very close to said station, said initial estimated power can be lower, even greatly lower, than the minimum transmission power of the mobile terminal. In order to limit interference with other communications in progress, the transmission of said signals is inhibited if the difference between the minimum transmission power and the initial estimated power lies beyond a predefined threshold.

16 Claims, 1 Drawing Sheet

U.S. PATENT DOCUMENTS

| | | | |
|---|---|---|---|
| 6,944,456 B1* | 9/2005 | Bhatoolaul et al. | 455/450 |
| 7,069,033 B1* | 6/2006 | Moon et al. | 455/522 |
| 2002/0036996 A1* | 3/2002 | Ozluturk et al. | 370/355 |
| 2002/0094837 A1* | 7/2002 | Hamabe et al. | 455/522 |
| 2003/0123413 A1* | 7/2003 | Moon et al. | 370/335 |
| 2004/0066772 A1* | 4/2004 | Moon et al. | 370/342 |

FOREIGN PATENT DOCUMENTS

| | | | |
|---|---|---|---|
| EP | 0631397 | * | 12/1994 |
| WO | WO 99/65158 | | 12/1999 |

OTHER PUBLICATIONS

Technical Specification 3G TS 25.211 ("Physical Channels and mapping of transport channels onto physical channels (FDD)"), version 3.3.0, published by the 3GPP, Jun. 2000, sections 5.3.3.1 and 5.3.3.2.

Technical Specification 3GPP TS 25.214 ("Physical layer procedures (FDD)"), version 3.6.0, published by the 3GPP, Mar. 2001, sections 6 and 6.1, p. 27.

Technical Specification 3GPP TS 25.101 ("UE Radio Transmission and Reception (FDD)"), version 3.6.0 published by the 3GPP, Mar. 2001, section 6.4.3, p. 13 and p. 12.

Technical Specification 3G TS 25.303 ("Interlayer Procedures in Connected Mode"), version 3.3.0, published by the 3GPP, Mar. 2000, section 6.4.9, pp. 60-61.

Technical Specification 3GPP TS 25.304, ("UE Procedures in Idle Mode and Procedures for Cell Reselection in Connected Mode"), version 3.6.0, published by the 3GPP, Mar. 2001, section 5.2.

Technical Specification 3G TS 25.321, ("MAC Protocol Specification"), version 3.4.0, published by the 3GPP, Jun. 2000, section 11.2.2.

Technical Specification 3G TS 25.401, ("UTRAN Overall Description"), version 3.3.0, published by the 3GPP, Jun. 2000, pp. 20-21.

Technical Specification 3G TS 25.331, ("RRC Protocol Specification"), version 3.3.0, published by the 3GPP, Jun. 2000, sections 9, 8.1.1.3, 10.2.52.6.7, 10.3.6.47, 10.3.6.52, 10.2.52.6.8, 10.3.6.8, 10.3.6.75 and 8.5.9.

* cited by examiner

METHOD FOR CONTROLLING TRANSMISSION POWER

TECHNICAL FIELD

The present invention concerns radio communications with mobiles and more particularly the methods of controlling the transmission power of mobile terminals.

BACKGROUND OF THE INVENTION

Many radio communication systems use methods of controlling transmission power aimed at reducing the level of interference between different communications. Such control of power is of particular importance in spread spectrum systems using Code Division Multiple Access (CDMA). In such systems, several terminals can share the same frequency at each moment, the separation of the channels over the radio interface resulting from the quasi orthogonal nature of the spread codes respectively applied to the signals transmitted over those channels. In other terms, for a given channel, the contributions of the other channels are regarded as noise.

In particular, on the uplink, control of transmission power limits the transmission power of mobiles close to a base station to prevent the signals they are transmitting from masking the signals from mobiles further away. In general, the methods of controlling power use power control loops: the base station takes measurements on the signal received from a mobile (power, carrier-to-interference ratio (C/I), etc) and transmits commands to increase or reduce power on the downlink to tend toward a given quality objective. These methods cannot be used before a radio link is established between the base station and the mobile. In particular, they do not allow idle mobiles to determine the level of power at which they must transmit any random access requests.

With UMTS (Universal Mobile Telecommunications System) systems, the loops controlling transmission power on the uplink are described in technical specification 3G TS 25.401, version 3.3.0, published in June 2000 by the 3GPP (3rd Generation Partnership Project), pages 20–21.

For the power of the first signals transmitted by a mobile terminal to a base station, particularly to set up a new call, these power control loops are not operational, because the base station has not received any prior signal from the mobile terminal with which to take the required measurements. The mobile terminal then estimates the power of these first signals according to another procedure based on the attenuation of the signals transmitted by the base station and received by the mobile terminal. The base station broadcasts a marker signal indicating the power at which it has transmitted the said signal. The receipt of such marker signals enables the idle mobile to determine the resources used by the base station with which the link is best (cell selection) and to evaluate the attenuation of the signal from that station. From this it deduces an initial transmission power for the radio signals sent to the selected base station, and the greater the attenuation the greater the power.

In certain circumstances, particularly when the mobile terminal is very close to the receiving antenna of the base station, the result of this estimate can be a very low transmission power. Such may be the case, for example, with a call from a maintenance agent working on the base station itself and using his radio terminal.

Because of its construction, a radio terminal has a minimum radio transmission power below which it is not capable of transmitting. Technical specification 3G TS 25.101, version 3.6.0, published in March 2001 by the 3GPP, recommends a minimum transmission power by UMTS mobile terminals of −50 dBm (section 6.4.3, page 13).

If the transmission power estimated for the random access request is less than this minimum power, the mobile terminal transmits the random access request with its minimum transmission power (see technical specification 3G TS 25.214, version 3.6.0, published by the 3GPP in March 2001, section 6.1, page 27).

If this transmission power is significantly greater than the estimated power based on the attenuation measurements, said transmission may generate consequent noise for the other radio signals received by the base station and therefore adversely affect the transmission quality of the calls in progress to which those other signals belong.

A purpose of the present invention is to prevent such interference that one call can cause to all the others.

SUMMARY OF THE INVENTION

The present invention thus proposes a method of controlling the transmission power of a mobile radio terminal on a communication resource of a base station, the mobile terminal having a minimum radio signal transmission power. According to the invention, before transmitting radio signals for entering into communication with the base station, the mobile terminal estimates an initial transmission power for the radio signals on said resource, compares the difference between its minimum transmission power and the estimated initial power with a predefined threshold, and inhibits transmission of radio signals on said resource if the difference lies beyond the said threshold.

The radio signals in question typically transport the random access requests of the mobile terminal. They may however be of another type (for example, encoded speech signals in the case of a telephone call being transferred from another base station or another radio communication system).

The mobile terminal is denied access to the base station resource if it is so close to the base station antenna that transmission at its minimum power would generate an excessive level of interference for other calls in progress. This excessive level is quantified by the threshold for comparison used by the terminal.

This threshold may vary according to the type of radio resource. Thresholds can be set that are differentiated according to the frequency band used by the base station and according to the type of radio communication system (in the case of multimode terminals), etc. For each type of resource, the threshold may be a fixed threshold previously registered in the radio terminal. In the event of the random access request being denied on a first communication resource of a base station, the call setup may be directed to other resources with less risk of interference with radio communications in progress.

In a preferred embodiment, the value of said threshold is included in system information broadcast by the base station and received by the mobile terminal before entering into communication with that base station. It is then a configuration parameter of the base station that can be adjusted by the operator to suit the characteristics of the cell (size, proximity of the antenna to the public highway, etc). Said parameter can also be varied over time (time of day, day of the week), or in an adaptive manner according to the traffic load observed in the cell served by the base station.

In a known manner, the estimate of the initial power by the mobile terminal can take account of the attenuation on the downlink: the base station broadcasts a marker signal at a determined transmission power, and the mobile terminal measures the reception power of said signal to estimate the initial transmission power of the signals sent to the base station.

Another aspect of the invention relates to a mobile terminal comprising means for transmitting radio signals with a transmission power at least equal to a set minimum power, means for estimating an initial transmission power of radio signals on a communication resource to enter into communication with a base station, means for comparing the difference between the said minimum power and the initial estimated power with a predefined threshold, and means for inhibiting the transmission of radio signals on said resource if the difference lies beyond said threshold.

A third aspect of the invention relates to a radio communication base station comprising means for transmitting and receiving radio signals, in which the transmission means comprise means for broadcasting system information including the value of a power threshold, such as to prevent mobile terminals situated within range of the base station from sending radio signals on a communication resource, before establishing a radio link with said base station, with a transmission power greater than an initial power estimated by the mobile terminal, increased by the value of said threshold.

DESCRIPTION OF PREFERRED EMBODIMENTS

The invention is described here in its application to the radio access network of a cellular system of the UMTS type. This access network, called UTRAN (UMTS Terrestrial Radio Access Network) uses the CDMA technique. It comprises radio network controllers 5, called RNC, which, over an Iub interface, control network nodes, called node B. Each node B comprises one or more base stations 1 each serving one or more cells. The said base stations communicate by radio with mobile terminals 2, 3, called UE (User Equipment) via a Uu interface (see technical specification 3G TS 25.401, version 3.3.0).

Figure 1:
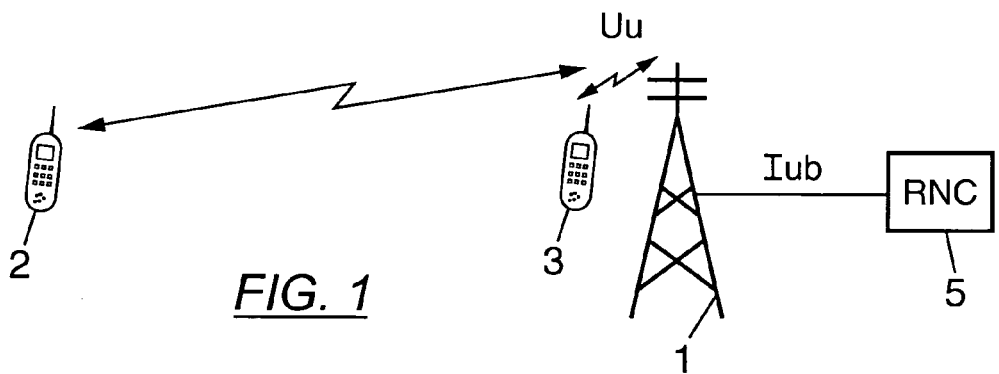
FIG. 1 represents two mobile terminals linked to a base station of a radio communication system.

The mobile terminals may be relatively distant from the base station or extremely close like mobile terminal 3 shown in FIG. 1.

Each UE 2, 3 can be in several states of liaison with the UTRAN, managed by a radio resource management protocol (RRC, Radio Resource Control) implemented in the RNC and the UE (see technical specification 3G TS 25.331, version 3.3.0, published in June 2000 by the 3GPP, section 9). In certain of these states, the UE is in active connection with the radio communication system, that is in particular that it can send to the base station radio signals concerning a call in progress. In these states, the loops for control of transmission power by the UE are operational.

When the UE is powered up and in a selected cell without being in communication with the UTRAN, it is in an "idle" state. The methods of initial selection and reselection of a cell are described in technical specification 3G TS 25.304, version 3.6.0 published in March 2001 by the 3GPP, section 5.2. In this idle state, after selecting a cell, the UE receives system information sent over a broadcast channel (BCH) by the base station of the selected cell (see technical specification 3G TS 25.331, version 3.3.0, section 8.1.1.3).

This system information includes:
  the power of transmission ("Primary CPICH DL TX power", in dBm) by the base station of a marker signal over a Common Pilot Channel, called CPICH, (see technical specification 3G TS 25.331, version 3.3.0, sections 10.2.52.6.7, 10.3.6.47 and 10.3.6.52). By subtracting the reception power of the CPICH (CPICH_RSCP) from this transmission power, the UE can estimate the attenuation on the propagation channel;
  two parameters, called "UL Interference" and "Constant Value", involved in the calculation of an initial power of transmission by the UE (see technical specification 3G TS 25.331, version 3.3.0, sections 10.2.52.6.7, 10.2.52.6.8, 10.3.6.47, 10.3.6.8 and 10.3.6.75).

The proposal here is to add to this system information a power threshold S, expressed in decibels, the role of which is detailed below.

Figure 2:
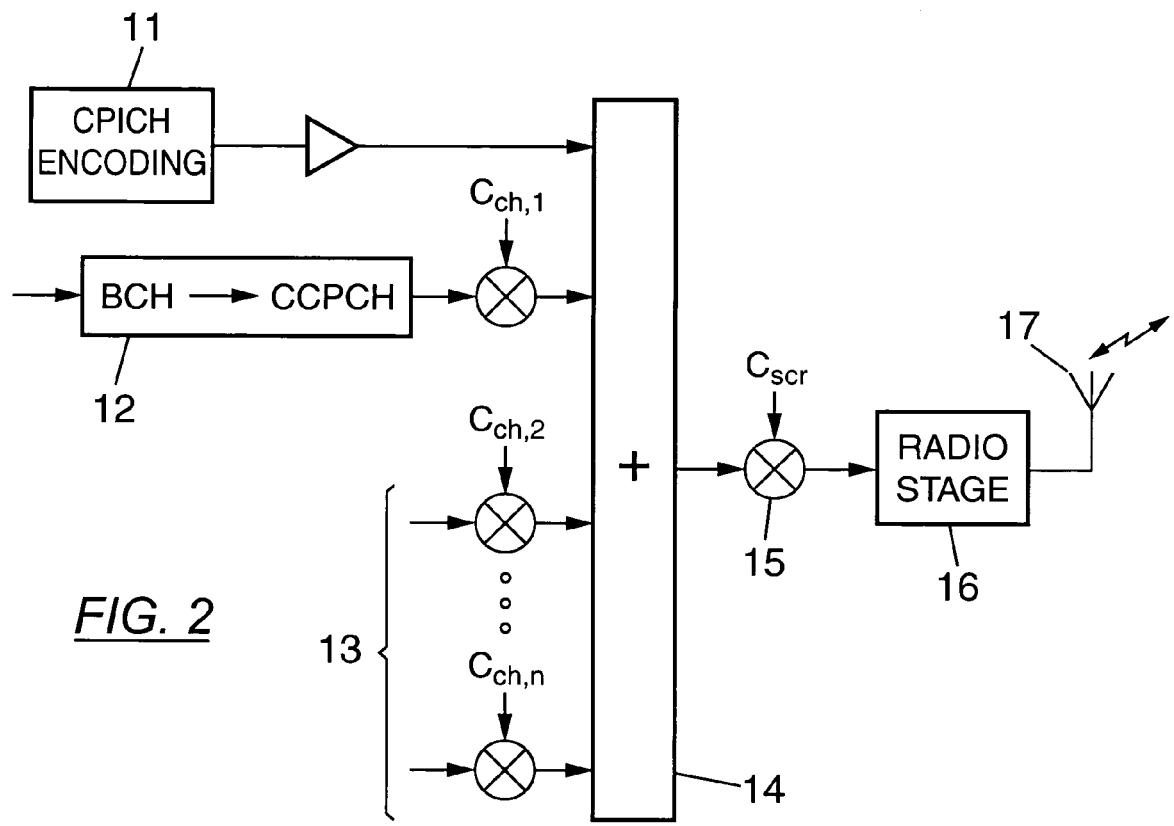
FIGS. 2 and 3 are partial schematic diagrams of a base station and a mobile terminal according to the invention respectively.

FIG. 2 shows schematically the transmission part of the base station 1. The data of the CPICH (see technical specification 3G TS 25.211, version 3.3.0, published in June 2000 by the 3GPP, section 5.3.3.1) are produced by a module 11 and amplified according to the transmission power "Primary CPICH DL TX power" specified by the RNC. The module 12 inserts the control information to be broadcast over the BCH into the physical channel intended to receive it, called the P-CCPCH ("Primary Common Control Physical Channel", see technical specification 3G TS 25.211, version 3.3.0, section 5.3.3.2) and applies the corresponding encoding. This control information, received from the RNC over the BCH bearer channel, includes in particular the abovementioned system information. In general, the CPICH has a "channelization" code of 1, so that it is directly added to the contributions of the other channels multiplied by their respective "channelization" codes $c_{ch,1}$, $c_{ch,2}$, ..., $c_{ch,n}$. Included among these other channels are the different dedicated channels 13 active in the cell.

The summed signal delivered by summation element 14 is multiplied by the scrambling code $c_{scr}$ of the cell, applied to multiplier 15. The output from this multiplier 15 is linked to radio stage 16 of the station which generates the radio signal transmitted by the antenna 17.

To initialize a communication, or more generally to transmit information to the UTRAN in idle mode, the. UE transmits to the selected base station a random access request signal over a common channel called PRACH ("Physical Random Access Channel").

Figure 3:
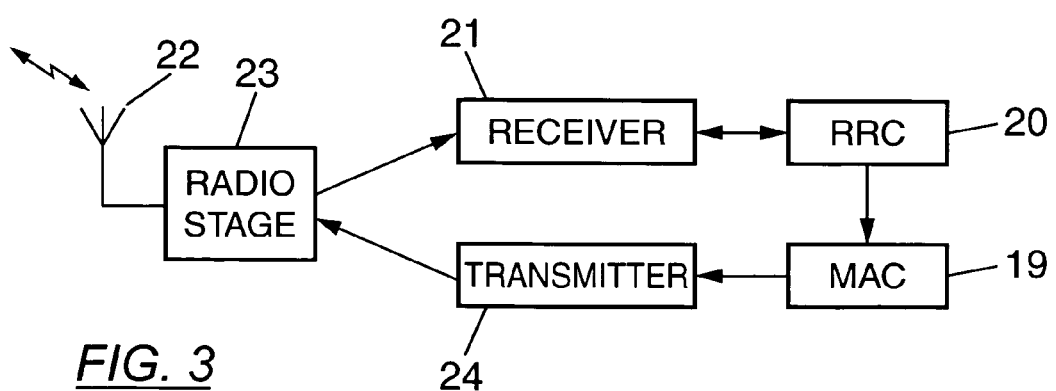

This random access procedure is executed by the physical layer (see technical specification 3G TS 25.214, version 3.6.0, section 6), under the control of the medium access control layer (MAC, see technical specification 3G TS 25.321, version 3.4.0, published in June 2000 by the 3GPP, section 11.2.2) and the RRC layer. The instances of the MAC and RCC protocols executed in the UE are illustrated by modules 19 and 20 respectively in FIG. 3.

The module 20 processes the system information decoded on the CCPCH by the reception part 21 of the UE based on the radio signal captured by the antenna 22 and processed by the radio stage 23. The receiver 21 also measures the reception power over the CPICH (parameter CPICH_RSCP according to technical specification 3G TS 25.215, version 3.3.0, published in June 2000 by the 3GPP, section 5.1.1) expressed in dBm.

Prior to transmission of the random access request, the RCC module 20 of the UE estimates a transmission power $P_I$ of this request ("Preamble_Initial_Power") on the basis of the last measurement of reception power CPICH_RSCP and of the transmission power of the base station over the CPICH as indicated in the broadcast system information. This estimate is made as indicated in technical specification 3G TS 25.331, version 3.3.0, section 8.5.9:

$P_I$=Preamble_Initial_Power=Primary CPICH DL TX power−CPICH_RSCP+UL interference+Constant Value The recommended accuracy for this determination is ±9 dB to ±12 dB, (technical specification 3G TS 25.101, version 3.6.0, page 12). For a UE 3 very close to the base station 1, this calculated transmission power value $P_I$ can be approximately −70 dBm for example.

Owing to the characteristics of the radio part 23 of the UE, the UE can send properly formatted radio signals only beyond a set minimum power $P_{min}$ (−50 dBm for example).

When $P_I < P_{min}$, the transmission part 24 of the UE sends the random access request over the PRACH channel with power $P_{min}$.

However, if the estimated power $P_I$ is too low (UE 3 very close to the antenna 17), transmission at $P_{min}$ may cause significant interference for the base station's reception of other active uplinks, which risks causing the calls on those channels to fail. That is why it is advisable to provide the abovementioned threshold S in the system information broadcast over the BCH. Usually, this threshold S will be positive, but, because of the specified accuracy of ±9 to ±12 dB, it may be advantageous to choose a negative threshold in certain cases. In the typical case where S>0, the transmitter 24 compares the difference $P_{min}-P_I$ with this threshold S to adopt the following behavior:

- if $P_{min}-P_I > S$, transmission of the random access request is inhibited, at least for certain requests;
- if $0 \leq P_{min}-P_I \leq S$, the random access request is sent at a power greater than or, preferably, equal to $P_{min}$;
- if $P_I \geq P_{min}$, the random access request is sent at a power greater than or, preferably, equal to $P_I$.

For certain types of calls, particularly emergency calls for which the risk of disrupting other established links can be tolerated, the random access request can be transmitted without taking account of threshold S. The request is sent at max $(P_{min}, P_I)$ even when $P_{min}-P_I > S$.

On receipt of a random access request, the node B and the RNC adopt the conventional responses specified in the standard. If a call is to be established, the transmission power of the UE will then be controlled by the abovementioned loops.

If the request has been inhibited, because of an estimated power $P_I$ less than $P_{min}-S$, the MAC module 19 may opt for another radio resource if such resources are available. Such an alternative resource will not be able to be found on the same bearer frequency as the one in which the request was denied since the same interference problem would be posed. It is preferable also that it be not found in an adjacent bearer frequency. On the other hand, it may be found in a separate frequency band. If the mobile terminal is multimode, the alternative resource may belong to an access network of a type other than UTRAN (GSM for example). This alternative resource may belong to the same base station or to another base station.

The RNC 5 (RRC layer) may, over time, vary the threshold S for each base station. When the density of traffic in the cell served by the base station is relatively high (or when the average C/I ratio is relatively high, which amounts to almost the same thing), there is usually an advantage in taking a low value for threshold S, for example a few dB, whereas a higher value is acceptable when traffic density falls. The RNC can therefore vary the threshold S according to the time of day and the day of the week. It can also measure the traffic load in the cell and dynamically adapt the value of threshold S.

The method described above, in which the UE is prevented from transmitting to a base station to which it is too close with regard to threshold S, applies mainly in cases of random access requests. It should be noted, however, that it can also be applied in other circumstances. For example, in a procedure for call transfer from a different radio access network, for example GSM ("Inter-system handover to UTRAN", see technical specification 3G TS 25.303, version 3.3.0, published in March 2000 by the 3GPP, section 6.4.9, pages 60–61), the mobile terminal proceeds as described above before transmitting the first link setup message of the MAC layer. The handover fails if the initial estimated power is below the terminal's minimum transmission power, with a difference greater than the threshold S of the cell that is the target of the handover.

The method can usually apply in any situation in which the mobile terminal is required to transmit an initial signal to a base station, a signal for which it must estimate the transmission power. Advantageously, it enables the limitation of the transmission power of that signal when constraints within the terminal do not make it possible to comply with the estimated power for that transmission.

The invention claimed is:

1. Method of controlling the transmission power of a mobile radio terminal on a communication resource of a base station, the mobile terminal having a minimum radio signal transmission power, wherein, before transmitting radio signals for entering into communication with the base station, the mobile terminal estimates an initial transmission power for the radio signals on said resource, compares the difference between its minimum transmission power and the estimated initial power with a predefined threshold, and inhibits transmission of radio signals on said resource if the difference lies beyond said threshold.

2. Method according to claim 1, wherein the base station broadcasts a marker signal at a determined transmission power, and wherein the mobile terminal measures a reception power of said marker signal and estimates the initial transmission power on said resource according to the measured reception power.

3. Method according to claim 1, wherein the mobile terminal transmits said radio signals at its minimum power if the difference is below said threshold.

4. Method according to claim 1, wherein the predefined threshold is selected according to a type of communication resource of the base station.

5. Method according to claim 4, wherein the predefined threshold is a threshold fixed for each type of communication resource of the base station and previously registered in the mobile terminal.

6. Method according to claim 1, wherein the value of said threshold is included in system information broadcast by the base station and received by the mobile terminal before entering into communication with the base station.

7. Method according to claim 6, wherein the value of said threshold varies over time.

8. Method according to claim 6, wherein the value of said threshold varies in an adaptive manner according to a traffic load observed on the base station.

9. Method according to claim 1, wherein said radio signals carry a random access request.

10. Mobile terminal, comprising means for transmitting radio signals with a transmission power at least equal to a set minimum power, means for estimating an initial transmission power of radio signals on a communication resource to enter into communication with a base station means for comparing the difference between said minimum power and the initial estimated power with a predefined threshold, and means for inhibiting the transmission of radio signals on said resource if the difference lies beyond said threshold.

11. Mobile terminal according to claim 10, wherein the means for estimating the initial power comprise means for measuring a reception power of a marker signal transmitted at a power determined by the base station.

12. Mobile terminal according to claim 10, comprising means for extracting the value of said threshold from system information broadcast by the base station and received before entering into communication with the base station.

13. Radio communication base station, comprising means for transmitting and receiving radio signals, characterized in that the transmission means comprise means for broadcasting system information including the value of a power threshold, such as to prevent mobile terminals situated within range of the base station from sending radio signals on a communication resource, before establishing a radio link with said base station, with a transmission power greater than an initial power estimated by the mobile terminal, increased by the value of the said threshold.

14. Base station according to claim 13, wherein the means for transmission include means for broadcasting a marker signal at a transmission power indicated in the system information.

15. Base station according to claim 13, wherein the value of said threshold varies over time.

16. Base station according to claim 13, wherein the value of said threshold varies in adaptive manner according to an observed traffic load.

* * * * *